United States Patent [19]
Sawada et al.

[11] Patent Number: 5,430,555
[45] Date of Patent: Jul. 4, 1995

[54] IMAGE PROCESSING APPARATUS USING HIGH REDUNDANCY PIXEL REPLACEMENT FOR GRAY LEVEL IMAGE COMPRESSION

[75] Inventors: Takayuki Sawada, Tokyo; Tadanobu Kamiyama, Yokosuka, both of Japan

[73] Assignee: Kabushiki Kaisha Toshiba, Kawasaki, Japan

[21] Appl. No.: 215,569

[22] Filed: Mar. 22, 1994

[30] Foreign Application Priority Data

Mar. 26, 1993 [JP] Japan .................. 5-068772
Dec. 20, 1993 [JP] Japan .................. 5-319417

[51] Int. Cl.6 .................. H04N 1/41; H04N 1/40
[52] U.S. Cl. .................. 358/429; 358/447; 358/455; 382/254
[58] Field of Search ............ 358/429, 433, 432, 426, 358/447, 458, 455, 451; 382/56, 54, 55

[56] References Cited

U.S. PATENT DOCUMENTS

| | | | |
|---|---|---|---|
| 4,290,084 | 9/1981 | Minshull et al. | 358/433 |
| 4,827,352 | 5/1989 | Yoneda et al. | |
| 4,841,375 | 6/1989 | Nakajima et al. | 358/466 |
| 4,873,577 | 10/1989 | Chamzas | 358/426 |
| 5,301,037 | 4/1994 | Kang et al. | 358/451 |

FOREIGN PATENT DOCUMENTS

| | | | |
|---|---|---|---|
| 191475 | 8/1988 | Japan | H04N 1/41 |
| 216977 | 8/1990 | Japan | H04N 1/41 |
| 4205675 | 7/1992 | Japan | . |

*Primary Examiner*—Scott A. Rogers
*Attorney, Agent, or Firm*—Cushman Darby & Cushman

[57] ABSTRACT

An image processing apparatus includes a first pixel replacing unit for replacing the positions of pixels in image data in accordance with a replacement rule so as to increase redundancy of the image data, an encoder for encoding the image data supplied from the first pixel replacing unit, an optical disk device for storing the image data encoded by the encoder, a decoder for decoding the image data supplied from the optical disk device, a second pixel replacing unit for replacing the positions of pixels in the image data supplied from the decoder to restore the image data before replacement by the first pixel replacing unit, an output unit for outputting the image data, a third pixel replacing unit for replacing the positions of pixels in the image data to be outputted on the output unit, and a pixel density varying unit for varying the pixel density of the image data supplied from the third pixel replacing unit.

11 Claims, 21 Drawing Sheets

| FLAG | INDICATES DATA SUBJECTED TO PIXEL REPLACEMENT | |
|---|---|---|
| BLOCK SIZE | m x n | *1 |
| SEQUENCE  1 | (x1, y1) ⟶ (x'1, y'1) | *2 |
|  2 | (x2, y2) ⟶ (x'2, y'2) | |
|  ⋮ | ⋮ | |
|  ℓ | (xℓ, yℓ) ⟶ (x'ℓ, y'ℓ) | |

*1) WHEN m=4, n=8

*2) $0 \leq x, x' \leq m, 0 \leq y, y' \leq n$
   WHEN x=0 REPLACEMENT OF ENTIRE ROW
   WHEN y=0, REPLACEMENT OF ENTIRE COLUMN
   WHEN x=0 AND y=0, END OF SEQUENCE

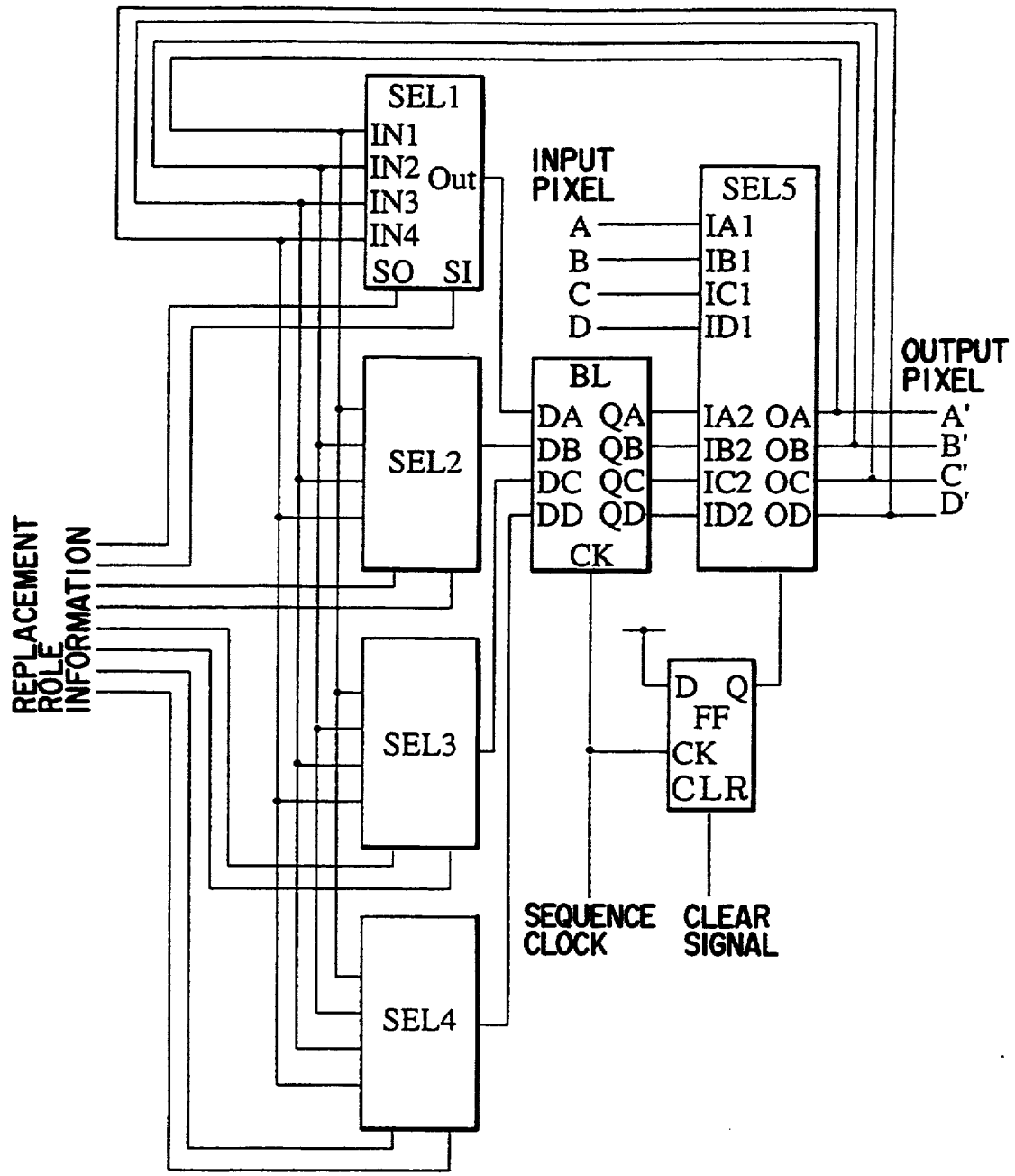
F I G. 8

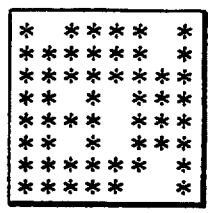
FIG. 13A
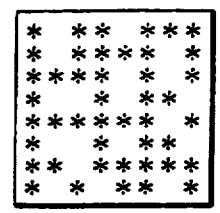
FIG. 14A
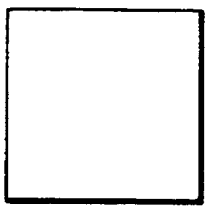
FIG. 13B
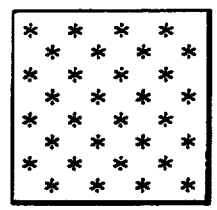
FIG. 14B
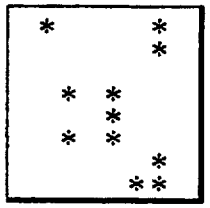
FIG. 13C
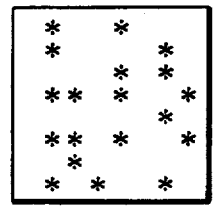
FIG. 14C
DISTRIBUTION DENSITY OF BLACK PIXEL
| INTENSITY VALUE | INPUT IMAGE (FIGS. 9A-9C) | REDUCED IMAGE (FIGS. 13A-13C) | REDUCED IMAGE (FIGS. 14A-14C) |
|---|---|---|---|
| 0.7 | 0.71 | 0.83 | 0.70 |
| 0.5 | 0.50 | 0 | 0.50 |
| 0.3 | 0.29 | 0.17 | 0.30 |
FIG. 15

| CLASS | ESTIMATED INTENSITY VALUE | SELECT SIGNAL |
|---|---|---|
| ⟨ a ⟩ | 0 ~ 7 , 64 | 0 |
| ⟨ b ⟩ | 8 ~ 15 | 1 |
| ⟨ c ⟩ | 16 ~ 23 | 2 |
| ⟨ d ⟩ | 24 ~ 31 | 3 |
| ⟨ d ⟩ | 32 ~ 39 | 3 |
| ⟨ c ⟩ | 40 ~ 47 | 2 |
| ⟨ b ⟩ | 48 ~ 55 | 1 |
| ⟨ a ⟩ | 56 ~ 63 | 0 |

F I G. 19

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
F I G. 20A
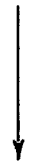
F I G. 20B

| 0 | 1 | 2 | 3 | 4 | 5 | 6 | 7 |
| --- | --- | --- | --- | --- | --- | --- | --- |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
F I G. 21A
| | | | | | | | |
| --- | --- | --- | --- | --- | --- | --- | --- |
| | 49 | | 51 | | 53 | | 55 |
| | | | | | | | |
| | 48 | | 50 | | 52 | | 54 |
| | | | | | | | |
| | 56 | | 58 | | 60 | | 62 |
| 25 | 9 | 27 | 11 | 29 | 13 | 31 | 15 |
| 41 | | 43 | | 45 | | 47 | |
F I G. 21B

|   |   |   |   |   |   |   |   |
|---|---|---|---|---|---|---|---|
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
F I G. 22A
|   |   |   |   |   |   |   |
|---|---|---|---|---|---|---|
|   |   | 7 | 23 | 11 |   |   | 2 |
|   | 16 |   | 4 |   | 20 |   |   |
| 9 |   | 25 |   | 13 | 28 |   | 3 |
|   |   | 18 | 33 |   | 21 |   | 37 |
|   |   | 26 |   | 43 |   | 30 |   | 46 |
| 44 |   |   | 35 | 40 |   | 39 |   |
|   | 53 |   |   |   | 49 |   |   |
|   |   | 62 |   |   |   | 58 |   |
F I G. 22B

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
F I G. 23A
|  | 41 |  | 43 |  | 45 |  | 47 |
|---|---|---|---|---|---|---|---|
| 32 |  | 34 |  | 36 |  | 38 |  |
|  | 57 |  | 59 |  | 61 |  | 63 |
| 48 |  | 50 |  | 52 |  | 54 |  |
| 8 |  | 10 |  | 12 |  | 14 |  |
|  | 1 |  | 3 |  | 5 |  | 7 |
| 24 |  | 26 |  | 28 |  | 30 |  |
|  | 17 |  | 19 |  | 21 |  | 23 |
F I G. 23B

| ROW NUMBER | CLASS <a> | CLASS <b> | CLASS <c> | CLASS <d> |
|---|---|---|---|---|
| 0 | 0 | 0 | 0 | 0 |
| 1 | 1 | 1 | 1 | 41 |
| 2 | 2 | 2 | 7 | 2 |
| 3 | 3 | 3 | 23 | 43 |
| 4 | 4 | 4 | 11 | 4 |
| 5 | 5 | 5 | 5 | 45 |
| 6 | 6 | 6 | 6 | 6 |
| 7 | 7 | 7 | 2 | 47 |
| 8 | 8 | 8 | 8 | 32 |
| 9 | 9 | 49 | 16 | 9 |
| 10 | 10 | 10 | 10 | 34 |
| 11 | 11 | 51 | 4 | 11 |
| 12 | 12 | 12 | 12 | 36 |
| 13 | 13 | 53 | 20 | 13 |
| 14 | 14 | 14 | 14 | 38 |
| 15 | 15 | 55 | 15 | 15 |
| 16 | 16 | 16 | 9 | 16 |
| 17 | 17 | 17 | 17 | 57 |
| 18 | 18 | 18 | 25 | 18 |
| 19 | 19 | 19 | 19 | 59 |
| 20 | 20 | 20 | 13 | 20 |
| 21 | 21 | 21 | 28 | 61 |
| 22 | 22 | 22 | 22 | 22 |
| 23 | 23 | 23 | 3 | 63 |
| 24 | 24 | 24 | 24 | 48 |
| 25 | 25 | 48 | 18 | 25 |
| 26 | 26 | 26 | 33 | 50 |
| 27 | 27 | 50 | 27 | 27 |
| 28 | 28 | 28 | 21 | 52 |
| 29 | 29 | 52 | 29 | 29 |
| 30 | 30 | 30 | 37 | 54 |
| 31 | 31 | 54 | 31 | 31 |
| 32 | 32 | 32 | 32 | 8 |
| 33 | 33 | 33 | 26 | 33 |
| 34 | 34 | 34 | 34 | 10 |
| 35 | 35. | 35 | 43 | 35 |
| 36 | 36 | 36 | 36 | 12 |
| 37 | 37 | 37 | 30 | 37 |
| 38 | 38 | 38 | 38 | 14 |
| 39 | 39 | 39 | 46 | 39 |
| 40 | 40 | 40 | 44 | 40 |
| 41 | 41 | 56 | 41 | 1 |
| 42 | 42 | 42 | 42 | 42 |
| 43 | 43 | 58 | 35 | 3 |
| 44 | 44 | 44 | 40 | 44 |
| 45 | 45 | 60 | 45 | 5 |
| 46 | 46 | 46 | 39 | 46 |
| 47 | 47 | 62 | 47 | 7 |

F I G. 24A

| ROW NUMBER | CLASS <a> | CLASS <b> | CLASS <c> | CLASS <d> |
|---|---|---|---|---|
| 48 | 48 | 25 | 48 | 24 |
| 49 | 49 | 9  | 53 | 49 |
| 50 | 50 | 27 | 50 | 26 |
| 51 | 51 | 11 | 51 | 51 |
| 52 | 52 | 29 | 52 | 28 |
| 53 | 53 | 13 | 49 | 53 |
| 54 | 54 | 31 | 54 | 30 |
| 55 | 55 | 15 | 55 | 55 |
| 56 | 56 | 41 | 56 | 56 |
| 57 | 57 | 57 | 57 | 17 |
| 58 | 58 | 43 | 62 | 58 |
| 59 | 59 | 59 | 59 | 19 |
| 60 | 60 | 45 | 60 | 60 |
| 61 | 61 | 61 | 61 | 21 |
| 62 | 62 | 47 | 58 | 62 |
| 63 | 63 | 63 | 63 | 23 |

F I G. 24B

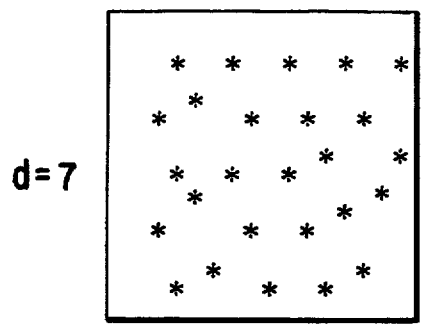
F I G. 26A  d=7
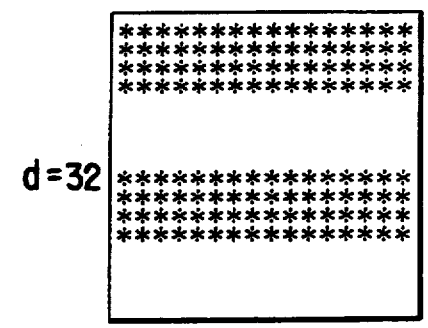
F I G. 26E  d=32
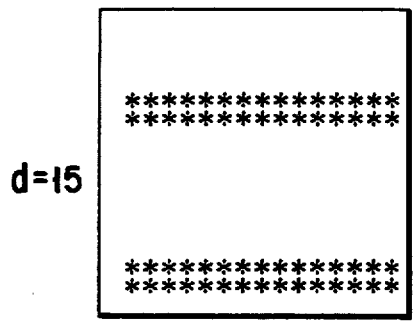
F I G. 26B  d=15
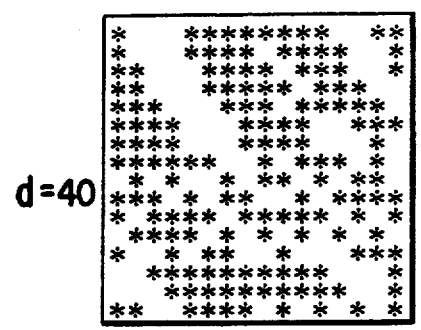
F I G. 26F  d=40
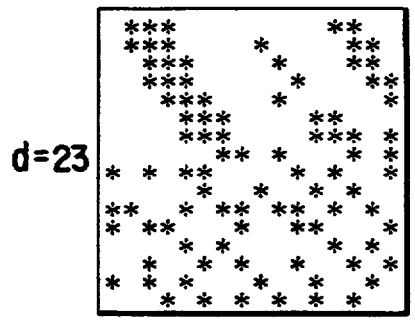
F I G. 26C  d=23
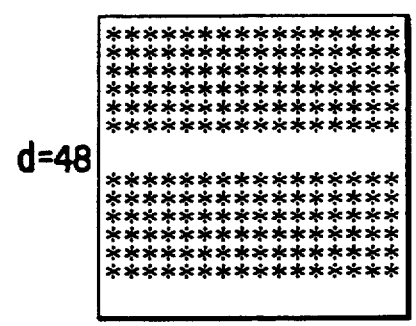
F I G. 26G  d=48
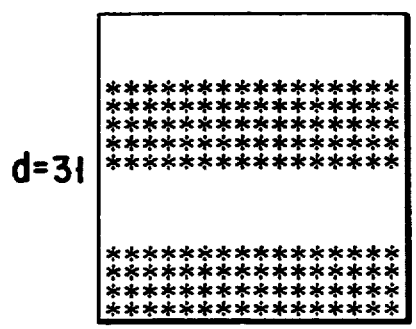
F I G. 26D  d=31
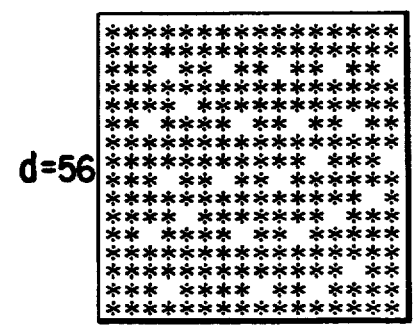
F I G. 26H  d=56

IMAGE PROCESSING APPARATUS USING HIGH REDUNDANCY PIXEL REPLACEMENT FOR GRAY LEVEL IMAGE COMPRESSION

BACKGROUND OF THE INVENTION

1. Field of the Invention

The present invention relates to an image processing apparatus which encodes image information and stores encoded image data in a storage medium such as an optical disk, or decodes encoded image data read out from the storage medium and outputs the decoded image data to a display device, a printing device, or the like.

2. Description of the Related Art

In an image processing apparatus such as an image filing system, a facsimile apparatus, or the like, high-efficiency encoding processing is performed to efficiently store and transmit image data. As for high-efficiency encoding processing, various methods are available, and these methods can efficiently compress document image data constituted by character or line images. This is due to high redundancy of document image data.

A gray scale image of an original such as a picture is binarized by quasi-gray scale processing. However, image data obtained by this processing has low redundancy. This is because binary data corresponding to a region having a uniform gray scale intensity value in an original is intentionally set to have a change in black-and-white gradation. Such gray scale image data cannot provide a high data compression effect like document image data. On the contrary, encoding for achieving data compression may result in an increase in data volume.

As a typical binarizing method based on quasi-gray scale processing, a dot-concentrated ordered dither method (to be referred to as a concentrated dither method hereinafter) and an error diffusion method are conventionally known. In the concentrated dither method, black pixels are concentrated in proportion to the intensity level, and gradation is expressed by the size of a group of black pixels. For this reason, the resolution is lowered in the concentrated dither method. In contrast to this, in the error diffusion method, simple binarizing errors of a pixel of interest are distributed to neighboring pixels to scatter black pixels as much as possible, and gradation is expressed by a local density of the black pixels.

when an image scanner binarizes a gray scale image of an original by an error diffusion method which can maintain gradation and resolution, no problem is posed when image data obtained from the image scanner is stored in a storage medium such as the optical disk. However, when image data read out from the storage medium is output to a reproduction output device such as a CRT which has a lower resolution than that of the image scanner as an input device, a problem associated with reproducibility of gradation is posed. More specifically, a region where black-and-white gradation must finely change may be displayed entirely in black.

In order to prevent deterioration of image quality such as generation of moiré in a concentrated dither image upon resolution conversion when image reproduction is performed by an output device having a resolution different from that of an input device, as described above, a method of performing resolution variation after an image is temporarily converted into a gray-scale image, and re-binarizing the gray-scale image is conventionally known in Japanese Patent Application (Kokai) Publication No. 4-205675, for example. However, since a quasi-gray scale processing method upon re-binarizing cannot be adaptively selected, a concentrated dither image is undesirably displayed in a region where an error diffusion image is to be reproduced and displayed.

As described above, a gray level image of an original such as a picture is binarized by quasi-gray scale processing. However, image data obtained by such processing has low redundancy, and coding for achieving data compression may result in an increase in data volume. In addition, when an image is output to a reproduction output device having a resolution lower than that of an input device, a region where black-and-white gradation must finely change may be displayed entirely in black, resulting in poor reproducibility of gradation.

SUMMARY OF THE INVENTION

It is an object of the present invention to provide an image processing apparatus which can improve compression efficiency of image data subjected to quasi-gray level processing and having a low redundancy, and can improve reproducibility by eliminating deterioration of image quality caused by resolution variation executed when image data obtained by the quasi-gray level processing is output to a reproduction output device having a lower resolution.

According to the first aspect of the present invention, there is provided an image processing apparatus comprising: supply means for supplying first image data having a plurality of pixels; first pixel replacing means for replacing positions of at least two pixels in the first image data supplied by the supply means to form second image data having high redundancy than that of the first image data; encoding means for encoding the second image data formed by the first pixel replacing means; storage means for storing the second image data encoded by the encoding means; decoding means for decoding the second image data stored in the storage means; and second pixel replacing means for replacing positions of pixels in the second image data decoded by the decoding means to supply the first image data of which pixels are replaced by the first pixel replacing means.

According to the first aspect, there is also provided an image processing apparatus further comprising display means for displaying image data, third pixel replacing means for replacing positions of pixels in the image data displayed by the display means, and pixel density varying means for varying a pixel density of the image data supplied from the third pixel replacing means.

According to the second aspect of the present invention, there is provided an image processing apparatus comprising: supply means for supplying first image data having a plurality of pixels; estimating means for estimating an intensity value of the first image data supplied by the supply means; first storage means for storing a plurality of parameters to set a plurality of pixel replacement functions corresponding to an intensity of image data, the pixel replacement function defining a pixel replacing rule to replace pixels so as to increase redundancy of the first image data; means for setting a pixel replacing function based on the intensity estimated by the estimating means and the plurality of parameters stored in the first storage means; first pixel replacing means for replacing positions of pixels in the first image data in accordance with the pixel replacing function set by the setting means so as to supply second image data; encoding means for encoding the second image data supplied from the first pixel replacing means; second storage means for storing the second image data encoded by the encoding means and the pixel replacing function set by the setting means; decoding means for decoding the second image data stored in the second storage means; and second pixel replacing means for replacing positions of pixels in the second image data decoded by the decoding means in accordance with the pixel replacing function stored in the second storage means so as to supply the first image data of which pixels are replaced by the first pixel replacing means.

According to the second aspect, there is also provided an image processing apparatus further comprising means for determining a binarizing method of image data, means for converting the image data into gray-scale data, pixel density varying means for varying a pixel density of the gray-scale image data obtained by the converting means, re-binarizing means for re-binarizing the image data density-varied by the pixel density varying means by a plurality of binarizing methods, selecting means for selecting one of a plurality of image data binarized by the plurality of binarizing methods by the re-binarizing means based on the binarizing method determined by the determining means, and display means for displaying the re-binarized image data selected by the selecting means.

In the image processing apparatus according to the first aspect of the present invention, image data supplied from the first pixel replacing means for replacing the positions of pixels in image data is coded, the coded image data is stored in the storage means, and the positions of pixels in image data supplied from the decoding means for decoding the image data supplied from the storage means are replaced to restore a format before replacement by the first pixel replacing means.

Furthermore, in the image processing apparatus according to the first aspect, the pixel density of image data supplied from the third pixel replacing means for replacing the positions of pixels in the image data to obtain a redundant format is varied, and the density-varied data is displayed on the display means.

In the image processing apparatus according to the second aspect of the present invention, the intensity of image data is estimated, a pixel replacing function is output based on the estimated intensity, the positions of pixels in the image data are replaced by the first pixel replacing means on the basis of the pixel replacing function, the replaced image data is encoded, the encoded image data and the pixel replacing function are stored in the storage means, image data supplied from the storage means is decoded, and the positions of pixels in the decoded image data are replaced by the second pixel replacing means on the basis of the pixel replacing function stored in the storage means to restore a format before replacement by the first pixel replacing means.

Furthermore, in the image processing apparatus according to the second aspect, a binarizing method of image data is determined by the binarizing method determining means, the image data is converted into gray-scale image data, the pixel density of the gray-scale image data is varied, the density-varied image data is re-binarized by a plurality of binarizing methods, image data binarized based on the binarizing method determined by the binarizing method determining means is selected from a plurality of image data re-binarized by the plurality of binarizing methods, and the selected image data is displayed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a circuit diagram showing the circuit arrangement of a pixel replacement logic unit shown in FIG. 6;

FIGS. 13A, 13B, and 13C are views showing ½ pixel density varying results of the images shown in FIGS. 9A to 9C;

FIGS. 14A, 14B, and 14C are views showing ½ pixel density varying results of the images shown in FIGS. 12A to 12C;

FIG. 15 is a table showing a list of black pixel distribution densities of the images shown in FIGS. 9A to 9C, FIGS. 13A to 13C, and FIGS. 14A to 14C;

FIG. 19 is a table showing an example of a classification result of estimated intensity values shown in FIG. 18;

FIGS. 20A and 20B are views for explaining pixel replacement;

FIGS. 21A and 21B are views for explaining pixel replacement;

FIGS. 22A and 22B are views for explaining pixel replacement;

FIGS. 23A and 23B are views for explaining pixel replacement;

FIGS. 24A and 24B are tables showing examples of pixel replacing functions F defined in units of classes of the estimated intensity values shown in FIG. 19;

FIGS. 26A to 26H are views for explaining the distribution of black pixels as a result of pixel replacement for the images shown in FIGS. 25A to 25H.

DETAILED DESCRIPTION OF THE PREFERRED EMBODIMENTS

The preferred embodiments of the present invention will be described below with reference to the accompanying drawings.

Figure 2:
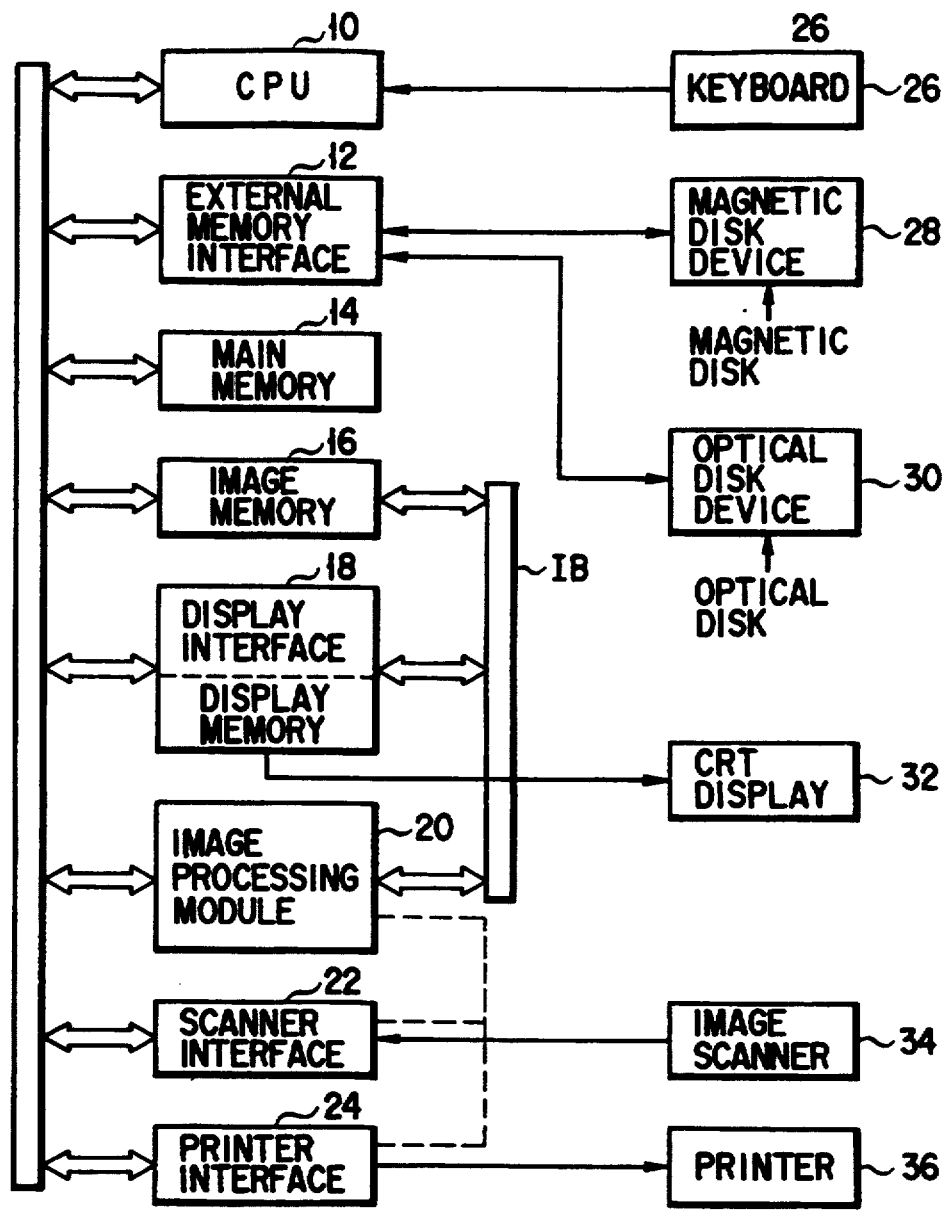
FIG. 2 is a block diagram showing the hardware arrangement of the image filing system shown in FIG. 1.

FIG. 2 shows the basic hardware arrangement of an image filing system as an image processing apparatus according to the first embodiment. The image filing system comprises a CPU 10, an external memory interface 12, a main memory 14, an image memory 16, a display interface 18, an image processing module 20, a scanner interface 22, a printer interface 24, a keyboard 26, a magnetic disk device 28, an optical disk device 30, a CRT display 32, an image scanner 34, a printer 36, a system bus SB, and an image bus IB.

The CPU 10 is used for executing various kinds of control for, e.g., image storage, retrieve, and edit processing operations, and the like. The CPU 10 is connected to the keyboard 26 directly, to the magnetic disk device 28 and the optical disk device 30 via the external memory interface 12, to the image scanner 34 via the scanner interface 22, and to the printer 36 via the printer interface 24. The image scanner 34 two-dimensionally scans an original (document) with a laser beam to output image data in accordance with an original image. The optical disk device 30 has an optical disk as a storage medium, sequentially stores image data of an original obtained from the image scanner 34, and retrieves image data corresponding to a retrieval code. The keyboard 26 is used for inputting a specific search code corresponding to image data stored in the optical disk device 30, and various operation commands for storage, search, and edit processing operations, and the like. The magnetic disk device 28 has a magnetic disk as a storage medium, and stores retrieval data (retrieval information) consisting of a retrieval code input from the keyboard 26, a storage address on the optical disk where image data corresponding to the retrieval code is stored, an image size, and the like. The main memory 14 stores a control program for the CPU 10, management information, and the like. The image memory 16 serves as a work area for image data processed by the image processing module 20, and temporarily stores image data to be stored in the optical disk and image data read out from the optical disk. The display interface 18 includes a display memory 18A for temporarily storing image data obtained from the image scanner 34, and image data obtained from the optical disk device 30, and is connected to the CRT display 32 for displaying image data stored in the display memory 18A. The printer 36 is used for printing image data obtained from the image scanner 34, image data obtained from the optical disk device 30, or image data displayed on the CRT display 32. The system bus SB is a bus for control signals of the respective devices, and interconnects the CPU 10, the external memory interface 12, the main memory 14, the image memory 16, the display interface 18, the image processing module 20, the scanner interface 22, and the printer interface 24. The image bus IB is an exclusive bus for image data, and interconnects the image memory 16, the display interface 18, and the image processing module 20.

Figure 1:
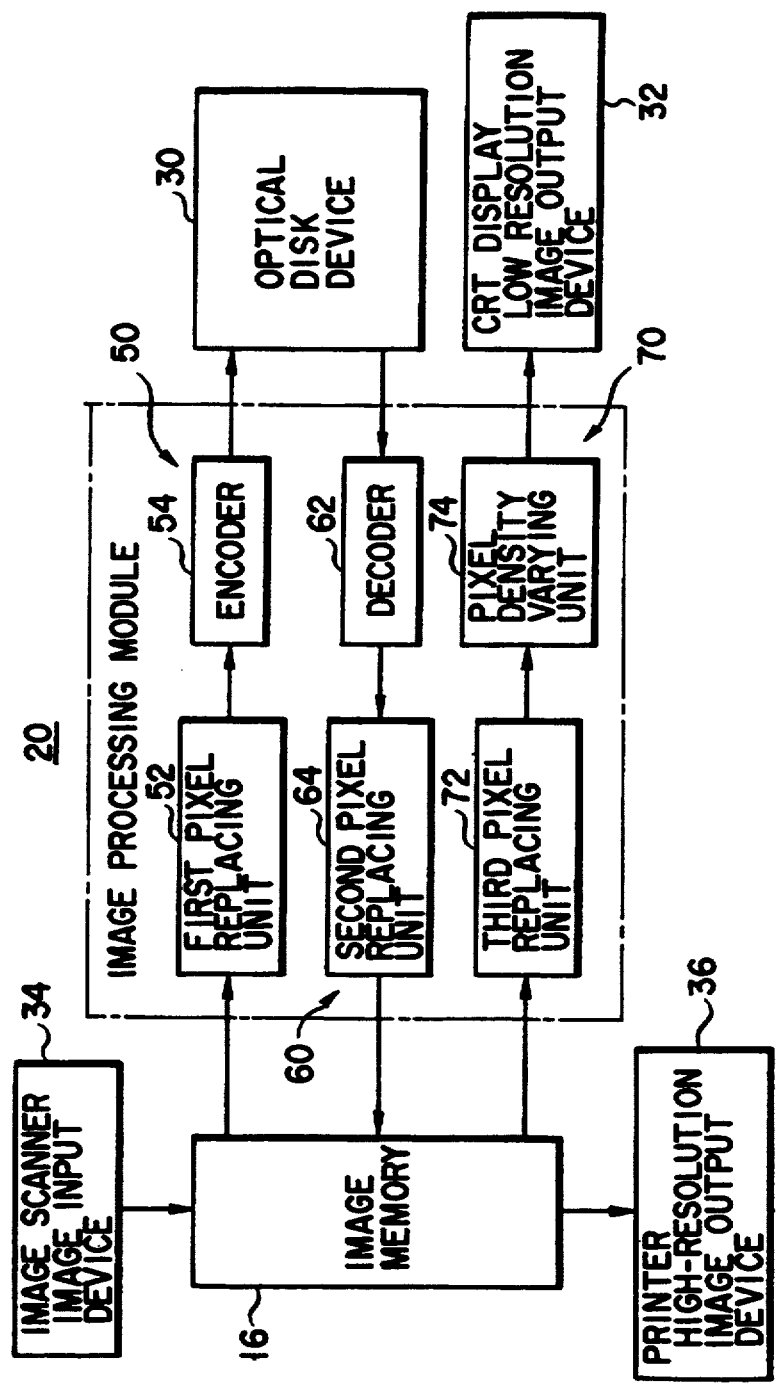
FIG. 1 is a functional block diagram showing the basic functions of an image filing system according to the first embodiment of the present invention.

The image processing module 20 comprises, as shown in FIG. 1, a compression circuit 50 for compressing image data supplied from the image memory 16 to the optical disk device 30, an expansion circuit 60 for expanding image data supplied from the optical disk device 30 to the image memory 16, and a resolution varying circuit 70 for executing variation processing for varying the resolution of image data supplied from the image memory 16 to the CRT display 32 to match it with that of the CRT display. Note that the image scanner 34 is an input device for binarizing an original image read from an original by error diffusion processing, the CRT display 32 is a low-resolution image output device, and the printer 36 is a high-resolution image output device.

The compression circuit 50 comprises a first pixel replacing unit 52 for regularly replacing the positions of pixels in image data read out from the image memory 16 so as to increase redundancy, and an encoder 54 for performing high-efficiency coding processing of image data obtained from the first pixel replacing unit 52, and storing coded image data as an image file in the optical disk device 30. The expansion circuit 60 comprises a decoder 62 for decoding image data read out from the optical disk device 30, and a second pixel replacing unit 64 for regularly replacing the positions of pixels in the image data decoded by the decoder 62 to restore the original data. The resolution varying circuit 70 comprises a third image replacing unit 72 for regularly replacing the positions of pixels in image data read out from the image memory 16, and an image density varying unit 74 for executing reduction processing of image data obtained from the third pixel replacing unit 72.

Figure 3:
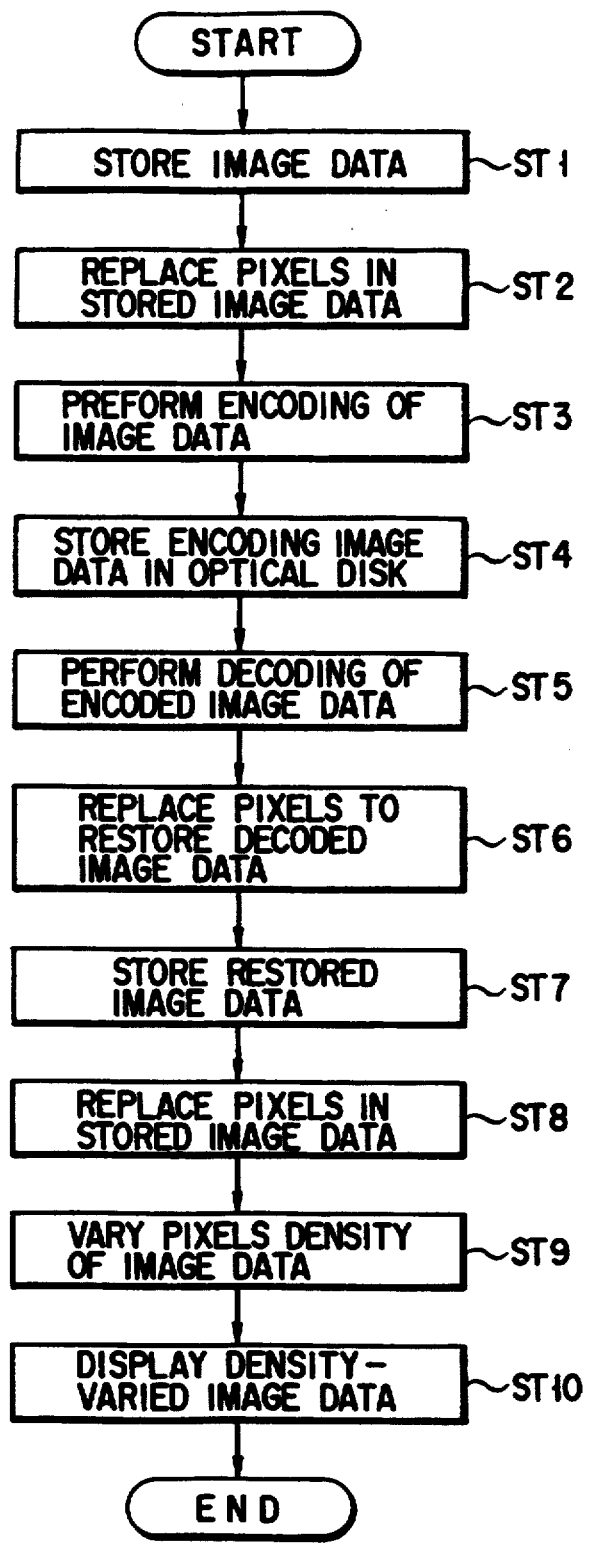
FIG. 3 is a flow chart showing the operation of the embodiment shown in FIGS. 1 and 2.

The operation of the image filing system of this embodiment will be described below with reference to FIG. 3. When image data is input from the image scanner 34, the CPU 10 stores the input image data in the image memory 16 in step ST1. When this image data is to be filed in the optical disk device 30, the image data is read out from the image memory 16, and is supplied to the first pixel replacing unit 52 in step ST2. The first pixel replacing unit 52 regularly replaces the positions of pixels in this image data to increase its redundancy, and supplies the replaced image data to the encoder 54 in step ST3. The encoder 54 encodes the image data supplied from the first pixel replacing unit 52, and stores the encoded data in the optical disk device 30 as an image file in step ST4. When this image data is to be subjected to image processing, the image data is read out from the optical disk device 30, and is supplied to the decoder 62 in step ST5. The decoder 62 decodes the image data supplied from the optical disk device 30, and supplies the decoded image data to the second pixel replacing unit 64 in step ST6. The second pixel replacing unit 64 regularly replaces the positions of pixels in the image data supplied from the decoder 62 to restore the original data, and stores the restored image data in the image memory 16 in step ST7. In the second pixel replacing unit 64, pixel replacement is executed in a sequence opposite to that of the first pixel replacing unit 52 so as to restore redundancy-increased data to the original data. Thus, the image memory 16 obtains the same image data as that input by the input device 34.

When the stored image data is to be output to the CRT display, the image data is read out from the image memory 16, and is supplied to the third pixel replacing unit 72 in step ST8. The third pixel replacing unit 72 regularly replaces the positions of pixels in the image data read out from the image memory 16, and supplies the replaced image data to the pixel density varying unit 74 in step ST9. The pixel density varying unit 74 varies the pixel density of the image data supplied from the third pixel replacing unit 72 to match it with the resolution of the CRT display 32 by reduction processing, and supplies the density-varied image data to the CRT display 32 in step ST10. However, when the image data is output to the printer 36 having the same resolution as that of the image scanner, the third pixel replacing unit 72 and the pixel density varying unit 74 do not execute the above-mentioned processing. More specifically, when the output device of image data is the CRT display having a lower resolution than that of the image scanner, the third pixel replacing unit 72 replaces the positions of pixels in the image data, and the pixel density varying unit 74 varies the pixel density of the image data obtained from the third pixel replacing unit 72 by reduction processing.

Figure 4A:
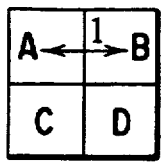
FIGS. 4A, 4B, and 4C are views showing examples of pixel replacement executed by an image processing module shown in FIG. 1.
Figure 4B:
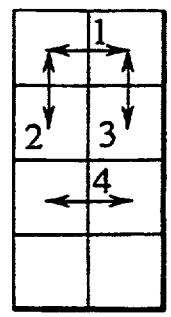
Figure 4C:
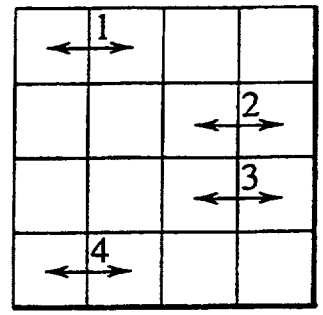
Figure 5:
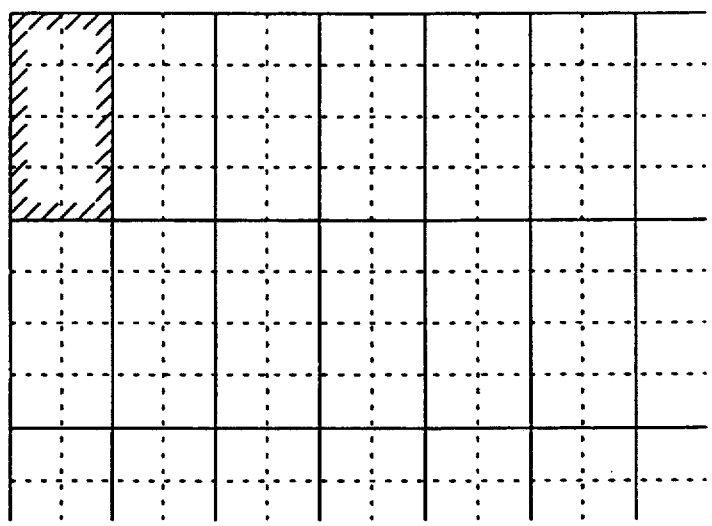
FIG. 5 is a view showing a state wherein image data is divided in units of 2×4 blocks by replacement based on the second pattern shown in FIG. 4B.

The functions of the first, second, and third pixel replacing units 52, 64, and 72 will be described in more detail below. In pixel replacing processing of these units, image data is divided into blocks each consisting of m×n pixels, and pixels in each block are replaced, as shown in FIGS. 4A to 4C, for example. FIG. 4A shows an example of pixel replacement in a first pattern executed in a 2×2 block, FIG. 4B shows an example of pixel replacement in a second pattern executed in a 2×4 block, and FIG. 4C shows an example of pixel replacement in a third pattern executed in a 4×4 block. Such replacement is executed in accordance with replacement rule information which is set in advance. The replacement rule information defines pixels to be replaced, and a replacing order of these pixels for pixel replacement to be executed in each block. Note that FIG. 5 shows a state wherein image data is divided into 2×4 blocks indicated by solid lines by replacement based on the second pattern shown in FIG. 4B. A hatched portion exemplifies a 2×4 block.

Figure 6:
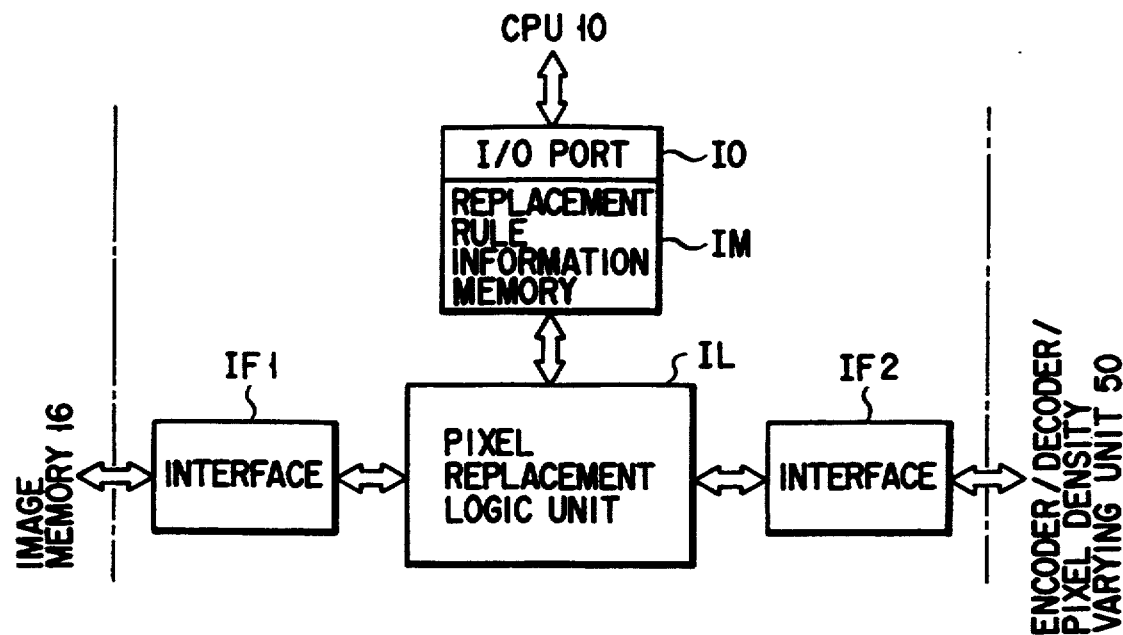
FIG. 6 is a block diagram showing the circuit arrangement common to first, second, and third pixel replacing units shown in FIG. 1.

Each of the first, second, and third pixel replacing units 52, 64, and 72 has a common arrangement, as shown in, e.g., FIG. 6. More specifically, each replacing unit comprises an interface IF1 on the side of the image memory 16, which interface includes a line buffer, a replacement rule information memory IM which has an I/O port IO, and stores replacement rule information supplied from the CPU 10 via the I/O port IO, a pixel replacement logic unit IL for replacing pixels in accordance with the replacement rule information, and an interface IF2 on the side of an input/output device 50, which interface includes a line buffer. The line buffer is arranged since pixels to be replaced upon pixel replacement in information to be accessed by a main scan for n lines (the block size of pixels to be replaced is m×n) must be internally held. The pixel replacement logic unit IL is programmed by replacement rule information set in the replacement rule information memory IM by the CPU 10, and the like.

Figure 7:
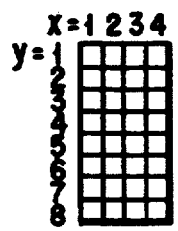
FIG. 7 is a view showing an example of pixel replacing management information including replacement rule information set in a replacement rule information memory in the first pixel replacing unit shown in FIG. 1.

FIG. 7 shows an example of pixel replacement management information including replacement rule information set in the replacement rule information memory IM in the first pixel replacing unit 52. This management information is added to image data obtained from the encoder 54, and is stored in the optical disk device 30. The pixel replacement management information is read out from the optical disk device 30 together with the image data, and the replacement rule information included in the readout information is set in the replacement rule information memory IM in the second pixel replacing unit 64 after it is converted into a sequence opposite to the replacement sequence executed by the first pixel replacing unit 52.

FIG. 8 shows the arrangement of the pixel replacement logic unit IL. In this arrangement, a 2×2 block unit shown in FIG. 4A is assumed for the sake of simplicity, and a maximum of four pixels are replaced in this block. More specifically, the pixel replacement logic unit IL outputs replaced output pixel values A', B', C', and D' in correspondence with pixel values A, B, C, and D corresponding to four input pixels. The pixel replacement logic unit IL comprises four first selectors SEL1 to SEL4 arranged in correspondence with a total of four pixels, a block buffer BL, a second selector SEL5, and a D-type flip-flop FF. The selectors SEL1 to SEL4 respectively select one of four pixels in corresponding replacement steps of the replacement rule information sequentially input from the memory IM as select signals, and the selection results of the first selectors SEL1 to SEL4 are respectively supplied to D terminals DA, DB, DC, and DD of the block buffer BL comprising, e.g., four D-type flip-flops. These selection results are stored in the block buffer BL in response to sequence clocks input from the CPU 10 in units of replacement steps, and are supplied to second input terminals IA2, IB2, IC2, and ID2 of the selector SEL5 as intermediate results of the corresponding replacement steps. The pixel values A, B, C, and D are supplied to first input terminals IA1, IB1, IC1, and ID1 of the selector SEL5. The selector SEL5 selects the input pixel values A, B, C, and D in an initial state wherein a clear signal is supplied from the CPU 10 to the D-type flip-flop FF, and thereafter, selects the intermediate results supplied from the block buffer BL to second input terminals IA2, IB2, IC2, and ID2. While the intermediate results are selected, the selected intermediate results are returned from output terminals OA, OB, OC, and OD to the input terminals of the four selectors SEL1 to SEL4.

Examples of actual pixel replacing processing will be described below.

Figure 9A:
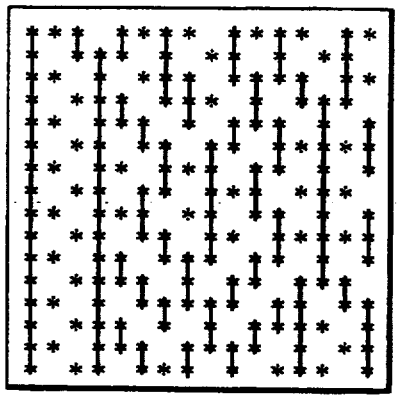
FIGS. 9A, 9B, and 9C are views showing quasi-gray level images obtained by error diffusion processing.
Figure 9B:
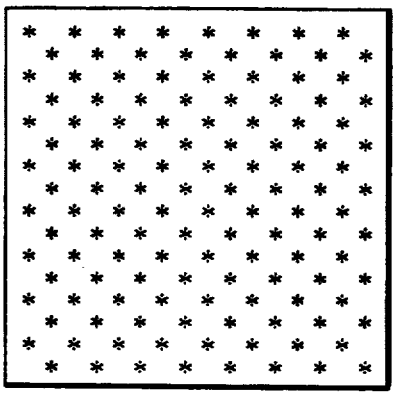
Figure 9C:
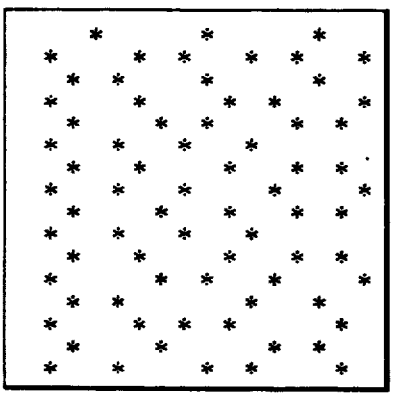

FIGS. 9A, 9B, and 9C show distribution patterns of quasi-gray scale black and white pixels by error diffusion processing. These patterns correspond to error diffusion processing results obtained when an original image which has an intermediate intensity when an intensity=0 is white and an intensity=1 is black is read by the image scanner 34. FIGS. 9A, 9B, and 9C respectively show cases of intensities=0.7, 0.5, and 0.3. In quasi-gray scale expression by the error diffusion processing, black pixels are scattered as randomly as possible, and the distribution density of the black pixels represents an intensity. However, since black pixels are scattered, pixels shown in FIGS. 9A to 9C have a low correlation between vertically neighboring lines.

Figure 10A:
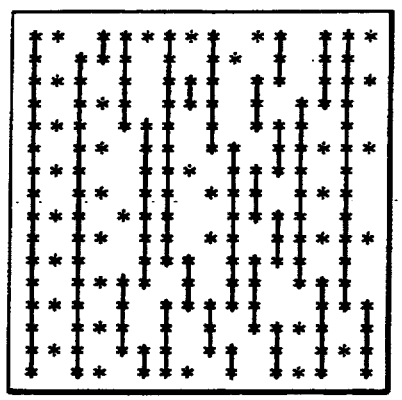
FIGS. 10A, 10B, and 10C are views showing pixel replacing results of the images shown in FIGS. 9A to 9C on the basis of the first pattern.

Thus, when replacement based on the first pattern (2×2 block) shown in FIG. 4A is performed, a vertical interline correlation apparently increases, as shown in FIG. 10A.

Figure 10B:
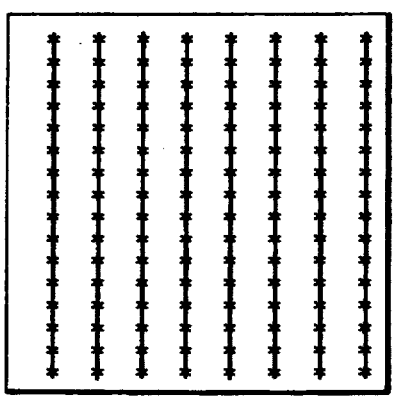

In FIGS. 9A and 10B, in order to allow easy visual understanding of an interline correlation, of asterisks representing black pixels, asterisks having an interline correlation, i.e., vertically neighboring asterisks, are connected by solid lines. For example, in FIG. 9A (intensity=0.7), there are 140 asterisks connected by solid lines, while in FIG. 10A, there are 148 asterisks connected by solid lines. Therefore, as can be understood from the above description, the vertical interline correlation is apparently higher in FIG. 10A. Upon counting the number of solid lines connecting asterisks, the number of lines is 40 in FIG. 9A, while the number of lines is 27 in FIG. 10A. This means that the number of asterisks connected by a single solid line in FIG. 10A is greater than that in FIG. 9A, and the vertical interline correlation in FIG. 10A is apparently higher. In the case of an intensity=0.5, as is apparent from FIGS. 9B and 10B, the vertical interline correlation in FIG. 10B is remarkably higher than that in FIG. 9B. In the case of an intensity=0.3 as well, the vertical interline correlation in FIG. 10C is higher than that in FIG. 9C.

Figure 10C:
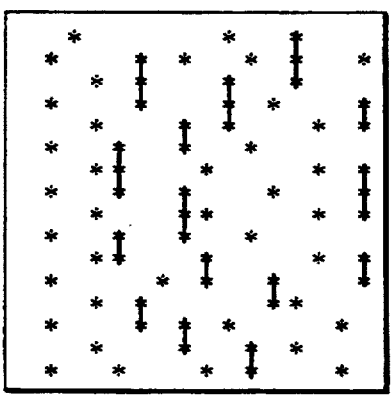
Figure 11A:
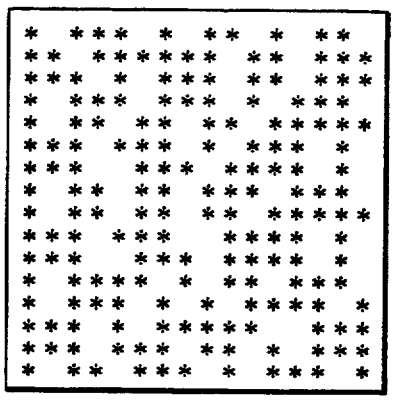
FIGS. 11A, 11B, and 11C are views showing pixel replacing results of the images shown in FIGS. 9A to 9C on the basis of the second pattern.
Figure 11B:
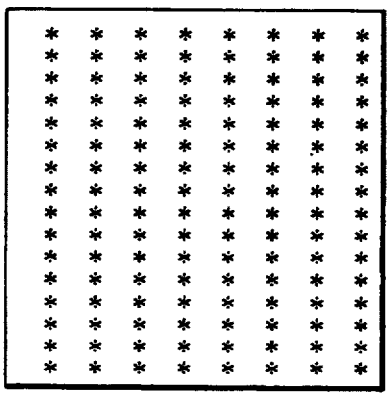
Figure 11C:
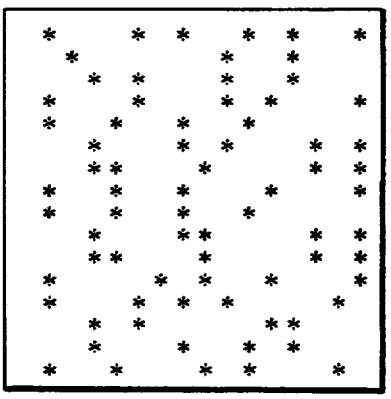

Also, FIGS. 11A to 11C show replacement results based on the second pattern shown in FIG. 4B, and the vertical interline correlations become stronger than those in FIGS. 10A to 10C. Therefore, when the first pixel replacing unit 52 executes such replacing processing, compression efficiency upon coding can be improved. In decoding, an original input image can be obtained by executing replacing processing in a sequence opposite to that described above by the second pixel replacing unit 64.

Figure 12A:
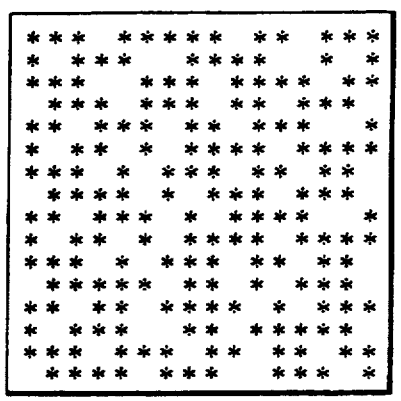
FIGS. 12A, 12B, and 12C are views showing pixel replacing results of the images shown in FIGS. 9A to 9C on the basis of the third pattern.
Figure 12B:
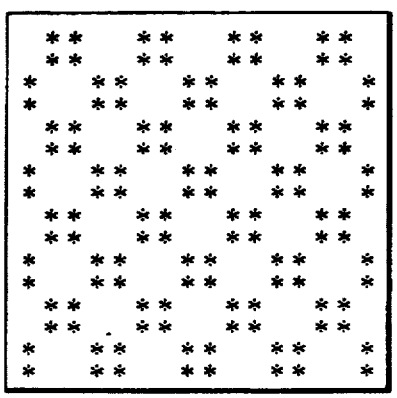

On the other hand, upon execution of replacement based on the third pattern shown in FIG. 4C, as best illustrated in FIG. 12B, a checkerboard pattern has a coarseness, in the vertical and horizontal directions, twice that of FIG. 9B, and the correlation among 2×2 neighboring pixels is strengthened. For example, when an image input at a resolution of 400 ppi is displayed at a resolution of 200 ppi, the image is displayed after its pixel density is varied to ¼. In this case, when 2×2 pixels have a high correlation, a variation in black pixel distribution density after pixel density variation can be suppressed, and good display reproducibility can be maintained.

Figure 12C:
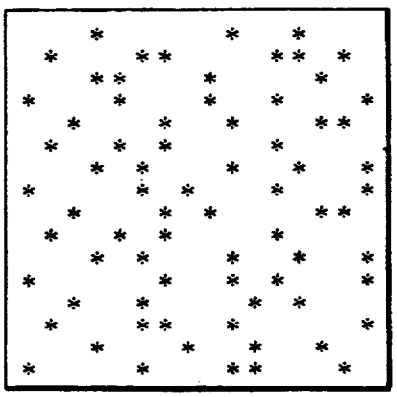

FIGS. 13A, 13B, and 13C show results obtained when the pixel densities of input images shown in FIGS. 9A to 9C are varied (reduced) to ½ in the vertical and horizontal directions, and FIGS. 14A to 14C show results obtained when image data are reduced to ½ after pixel replacement shown in FIGS. 12A to 12C. FIG. 15 shows a list of the black pixel distribution densities, i.e., intensities of the images shown in FIGS. 9A to 9C, FIGS. 13A to 13C, and FIGS. 14A to 14C. The results shown in FIGS. 13A to 13C have poor gray level reproducibility, and especially in FIG. 13B, only white pixels having an intensity=0 remain although pixels must originally represent an intensity=0.5. However, the black pixel distribution densities of FIGS. 14A, 14B, and 14C are almost equal to those of the input images shown in FIGS. 9A to 9C. Therefore, when pixel replacing processing using the third pattern is executed by the third pixel replacing unit 72, a low-resolution output device can maintain good gray level reproducibility.

As described above, according to the first embodiment, since encoding is performed after the interline correlation of a quasi-gray level image is forcibly increased by pixel replacement, compression efficiency by high-efficiency coding can be improved. Furthermore, since resolution variation (pixel density variation) is executed after the correlation among neighboring pixels is forcibly increased, good display reproducibility of a quasi-gray scale image can be maintained. Since the sequence of pixel replacing processing for increasing the interline correlation and the correlation among neighboring pixels is programmable, an optimal processing sequence can be set to obtain the above-mentioned two effects for every images.

The second embodiment will be described hereinafter with reference to FIG. 16 and subsequent drawings.

Since the basic hardware arrangement of an image filing system as an image processing apparatus according to the second embodiment has the same arrangement as that in the first embodiment described above with reference to FIG. 2, the same reference numerals in this embodiment denote the same parts as in the first embodiment, and a detailed description thereof will be omitted. However, an image processing module of this embodiment has a slightly different function and arrangement from those of the image processing module 20 of the first embodiment.

Figure 16:
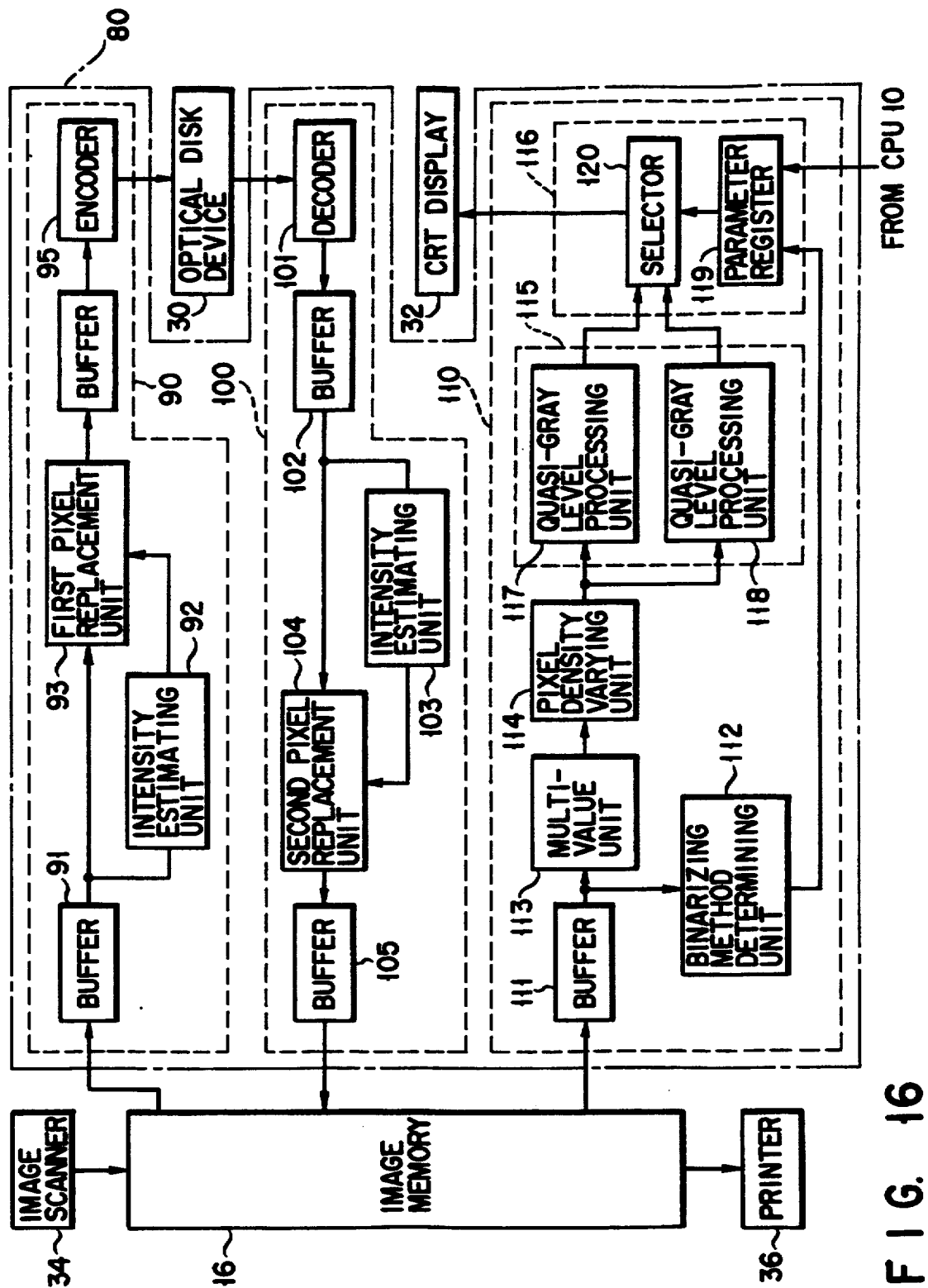
FIG. 16 is a functional block diagram showing the functions of an image filing system according to the second embodiment of the present invention.

FIG. 16 shows functional blocks for explaining the function and arrangement of an image processing module 80 of the second embodiment. More specifically, the image processing module 80 comprises a compression circuit 90 for compressing image data supplied from the image memory 16 to the optical disk device 30, an expansion circuit 100 for expanding image data supplied from the optical disk device 30 to the image memory 16, and a resolution varying circuit 110 for executing variation processing for varying the resolution of image data supplied from the image memory 16 to the CRT display 32 to match it with that of the CRT display 32. An output device such as a printer can be used for the CRT display 32.

The compression circuit 90 comprises a buffer 91 for temporarily storing image data read out from the image memory 16, an intensity estimating unit 92 for counting an estimated intensity value of image data from the buffer 91, a first pixel replacing unit 93 for regularly replacing the positions of pixels in image data from the buffer 91 in accordance with the estimated intensity value from the intensity estimating unit 92, a buffer 94 for temporarily storing image data obtained from the first pixel replacing unit 93, and an encoder 95 for executing high-efficiency encoding processing of image data from the buffer 94, and storing encoded image data in the optical disk device 30 as an image file.

The expansion circuit 100 comprises a decoder 101 for decoding image data read out from the optical disk device 30, a buffer 102 for temporarily storing image data from the decoder 101, an intensity estimating unit 103 for counting an estimated intensity value of image data from the buffer 102, a second pixel replacing unit 104 for regularly replacing the positions of pixels in image data from the buffer 102 in accordance with the estimated intensity value from the intensity estimating unit 103 so as to restore the original data, and a buffer 105 for temporarily storing image data from the second pixel replacing unit 104.

The resolution varying circuit 110 comprises a buffer 111 for temporarily storing image data read out from the image memory 16, a binarizing method determining unit 112 for determining a gray level processing method (binarizing method) of image data from the buffer 111, a gray-scale unit 113 for converting image data from the buffer 111 into gray-scale data, a pixel density varying unit 114 for executing reduction processing of image data from the gray-scale unit 113, a re-binarizing unit 115 for re-binarizing image data from the pixel density varying unit 114 by a plurality of methods (in this embodiment, two methods), and a binarizing method selecting unit 116 for selecting a binary data output by one method from a plurality of binary data re-binarized by the plurality of methods by the re-binarizing unit 115 in accordance with a select signal as the determination result of the binarizing method determining unit 112.

The re-binarizing unit 115 comprises a plurality of quasi-gray scale processing units of different methods (e.g., concentrated dither, error diffusion method, and the like) for binarizing gray-scale data. In this embodiment, the unit 115 comprises a quasi-gray scale processing unit 117 using a concentrated dither method, and a quasi-gray scale processing unit 118 using an error diffusion method.

The binarizing method selecting unit 116 comprises a parameter register 119 for receiving a select signal from the binarizing method determining unit 112 together with a select signal from the CPU 10, and a selector 120 for selecting binary data from one of the processing units 117 and 118 in accordance with a selection parameter set in the parameter register 119. In the parameter register 119, an arbitrary value can be set by an I/O output of the CPU 10, and a re-binarizing method can be arbitrarily set irrespective of the binarizing method of an original image.

Figure 17:
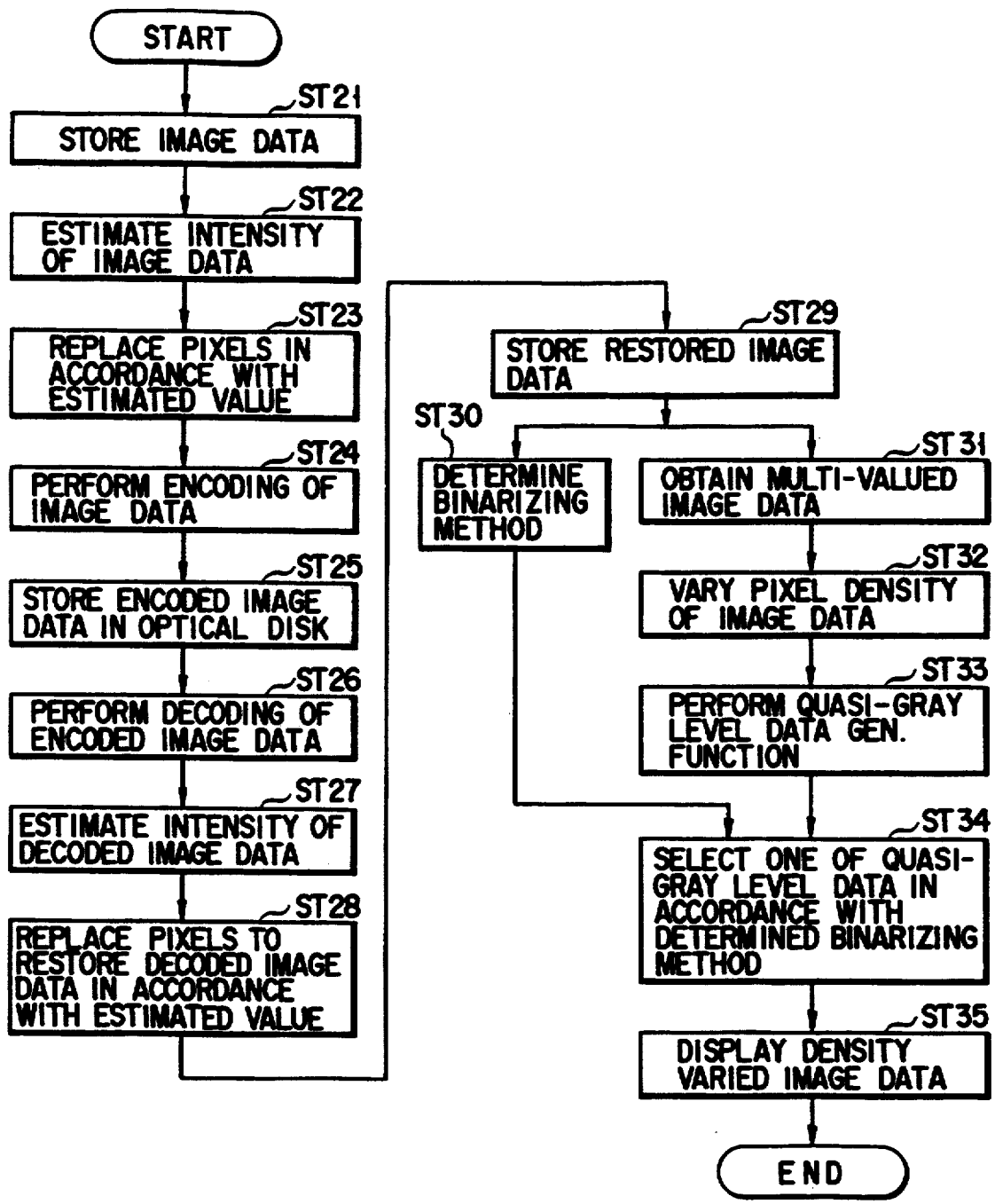
FIG. 17 is a flow chart for explaining the operation of the embodiment shown in FIG. 16.

The operation of the embodiment shown in FIG. 16 will be described below with reference to the arrangement shown in FIG. 2 and the flow chart in FIG. 17.

When image data is input from the image scanner 34, the CPU 10 stores the input image data in the image memory 16 in step ST21. When this image data is to be filed in the optical disk device 30, the image data is read out from the image memory 16, and is supplied to the first pixel replacing unit 93 via the buffer 91. In addition, an image intensity is estimated in step ST22. The first pixel replacing unit 93 regularly replaces the positions of pixels in the received image data in accordance with the estimated intensity value in step ST23, and supplies the replaced image data to the encoder 54 via the buffer 94. The encoder 54 encodes the image data supplied from the first pixel replacing unit 93 in step ST24, and stores the encoded image data in the optical disk device 30 as an image file in step ST25.

When this image data is to be subjected to image processing, the image data is read out from the optical disk device 30, and is supplied to the decoder 101. The decoder 101 decodes the image data supplied from the optical disk device 30 in step ST26, and supplies the decoded image data to the second pixel replacing unit 104 via the buffer 102. In addition, the intensity of the decoded image is estimated in step ST27. The second pixel replacing unit 104 regularly replaces the positions of pixels in the image data supplied from the decoder 101 in accordance with the estimated intensity value in step ST28 so as to restore an original format, and stores the restored image data in the image memory 16 in step ST29. In the second pixel replacing unit 104, pixel replacement is performed in an inverse function opposite to that in the pixel replacing unit 93 so as to restore the original data. Thus, the image memory 16 stores the same image data as that input by the input device 34.

When the image data stored in the image memory 16 is to be output to the CRT display 32, the image data is read out from the image memory 16, and is supplied to the binarizing method determining unit 112 via the buffer 111 in step ST30. Also, the readout image data is supplied to the gray-scale unit 113 in step ST31. In step ST30, the binarizing method determining unit 112 determines a gray level processing method (binarizing method) of the image data supplied from the buffer 111. In step ST31, the gray-scale unit 113 converts the image data supplied from the buffer 111 into gray-scale data, and supplies the gray-scale image data to the pixel density varying unit 114. The pixel density varying unit 114 executes reduction processing of the image data supplied from the gray-scale unit 113 in step ST32, and supplies the processed image data to the re-binarizing unit 115. The re-binarizing unit 115 re-binarizes the image data from the pixel density varying unit 114 by a plurality of methods in step ST33 so as to generate quasi-gray scale data, and supplies these data to the binarizing method selecting unit 116. The binarizing method selecting unit 116 selects one of the plurality of binary data re-binarized by the plurality of methods in the re-binarizing unit 115 in step ST34 in accordance with a select signal as the determination result of the binarizing method determining unit 112, and outputs the selected binary data to the CRT display 32. For example, image data using the error diffusion method from the processing unit 118 is supplied to the CRT display 32 to be displayed in step ST35.

The definition of pixel replacement in the first and second pixel replacing units 93 and 104 will be explained below.

In each of these pixel replacing units, image data is divided into subblocks each consisting of m pixels×n lines, and pixel replacement is performed in units of subblocks. In this embodiment, the size of a subblock is assumed to be 8×8. When a 64 (rows)×1 (column) matrix consisting of 64 pixels (=8×8) before replacement in the first subblock is represented by Pi, a 64 (rows)×1 (column) matrix after replacement is represented by Qi, and an estimated intensity value of each subblock is represented by d, a pixel replacement calculation is defined to be:

$$Qi = F(d) \cdot Pi$$

where F is a function of a 64×64 matrix determined in accordance with the estimated intensity value d, and in each row and each column, only one component is "1" and the remaining 63 components are "0".

The method of pixel replacing processing in the compression circuit 90 and the expansion circuit 100 will be described below.

A subblock of interest is read by the block buffer 91, and the number of black (or white) pixels in the block buffer is counted by a pixel counter used as the intensity estimating unit 92. The count value of the counter is used as an estimated intensity value. Therefore, the intensity estimating unit need only have a counter arrangement for receiving m×n pixels, counting the number of black (or white) pixels, and outputting a count value d.

Figure 18:
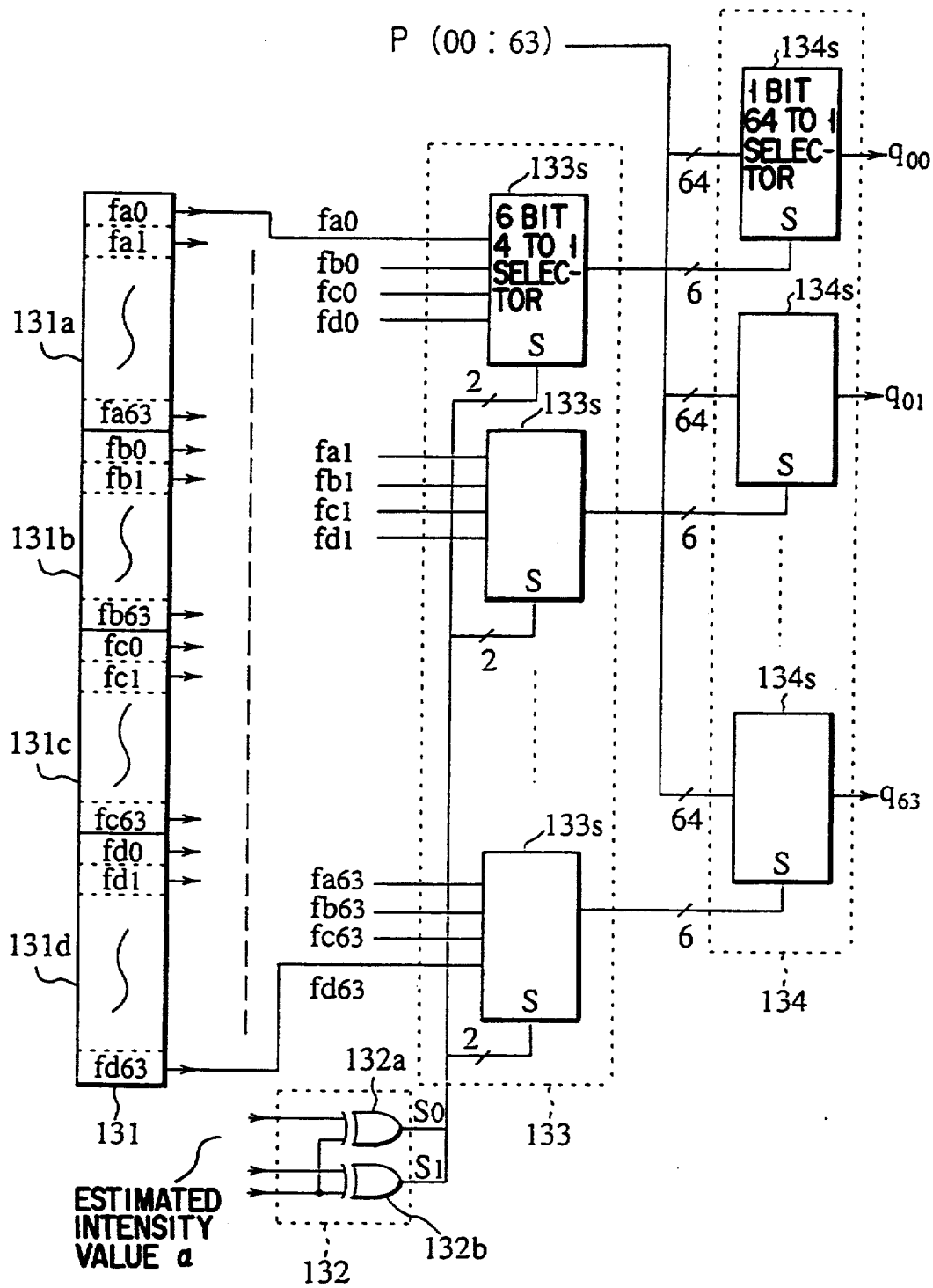
FIG. 18 is a schematic circuit diagram showing the arrangement of an image replacing unit shown in FIG. 16.

FIG. 18 shows the schematic arrangement of the first pixel replacing unit 93 in the compression circuit 90, and the second pixel replacing unit 104 in the expansion circuit 100. Each of these pixel replacing units comprises a function F storage unit 131, an estimated intensity value input/varying unit 132, a function F selecting unit 133, and a replacing processing unit 134.

The function F storage unit 131 comprises four storage tables (6 bits) 131a to 131d. More specifically, the function F is an mn×mn matrix, only one of mn components in one column is "1", and other components are "0", as described above. Since information for one row need only express the position of a component "1", and can assume mn values, it need only have an information amount of $\log_2$ (mn) bits. Therefore, the storage table (131a to 131d) has $\log_2$ (mn) bits×mn rows for storing one function F. Furthermore, in order to change the function F in accordance with an estimated intensity value d which can assume (mn+1) values, a maximum of (mn+1) storage tables (131a to 131d) are provided. In this embodiment, for the sake of simplicity, (mn+1)=65 different estimated intensity values are classified into four classes, and the function F is selected in units of classes. Therefore, the function F storage unit 131 of this embodiment uses the four storage tables 131a to 131d.

The function F selecting unit 133 comprises 64 (=nm) 6-bit 4-to-1 selectors 133s, . . . . Each selector 133s performs selection from data having the same number in the four storage tables 131a to 131d in association with data for one row of the function F. A select signal for selection is common to all the selectors 133s, as a matter of course.

A 2-bit select signal is generated by the estimated intensity value input/varying unit 132 on the basis of 3-bit data consisting of bits d3–d5 of the 7-bit estimated valued supplied from the intensity estimating unit 92. The estimated intensity value input/varying unit 132 comprises exclusive OR gates 132a and 132b, as shown in FIG. 18. FIG. 19 shows the relationship between the estimated intensity value d and the select signal in this case.

The replacing processing unit 134 comprises 64 1-bit 64-to-1 selectors 134s. Although 64 components of the matrix P are commonly input to the selectors 134s, select signals input to the selectors 134s are different from each other. As a select signal for the j-th selector 134s, data of the j-th row of the replacing function F selected and output from the j-th 4-to-1 selector 133s in the function F selecting unit 133 is used. Thus, the value of the j-th component of the matrix Q as the replaced pixel column data, i.e., the value of the j-th pixel is output. In this manner, the first and second pixel replacing units 93 and 104 execute a multiplication of matrices of a formula obtained by defining the pixel replacement calculation by Qi=F(d).Pi, as described above.

Examples of actual pixel replacing processing will be described below.

The estimated intensity values d in units of subblocks are classified into four classes <a>, <b>, <c>, and <d>, as shown in FIG. 19. In FIG. 19, when intensity values are separated from an intermediate values by almost the same value, they are classified into a single class irrespective of their levels.

FIGS. 20A and 20B to FIGS. 23A and 23B show examples of pixel replacement defined in units of classes (<a> to <d>).

In class <a>, as shown in FIGS. 20A and 20B, since no conversion is performed (no replacement of pixels is performed), pixels which are temporarily numbered from 0 to 63 in FIG. 20A are not replaced, and when the numbers of pixels which are not replaced are not filled in FIG. 20B, no pixel numbers are filled.

In class <b>, pixels which are temporarily numbered from 0 to 63 in FIG. 21A are replaced, and FIG. 21B shows the positions of pixels after replacement (the numbers of pixels which are not replaced are not filled in FIG. 21B). For example, pixel number 9 and pixel number 49, pixel number 51 and pixel number 11, and the like are replaced with each other.

In class <c>, pixels which are temporarily numbered from 0 to 63 in FIG. 22A are replaced, and FIG. 22B shows the positions of pixels after replacement (the numbers of pixels which are not replaced are not filled in FIG. 22B).

In class <d>, pixels which are temporarily numbered from 0 to 63 in FIG. 23A are replaced, and FIG. 23B shows the positions of pixels after replacement (the numbers of pixels which are not replaced are not filled in FIG. 23B).

FIGS. 24A and 24B show functions F (64×64 matrices) for performing pixel replacement shown in FIGS. 20A and 20B to FIGS. 23A and 23B.

Figure 25A:
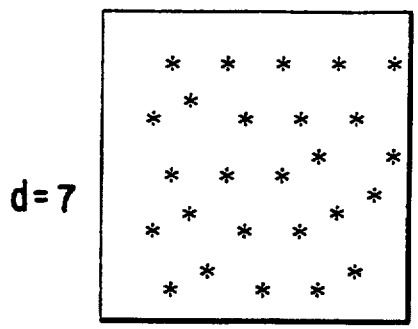
FIGS. 25A to 25H are views for explaining the distribution of black pixels in an error diffusion image.
Figure 25E:
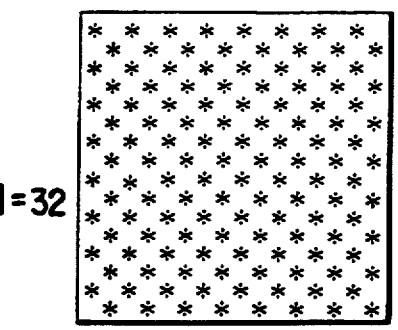
Figure 25B:
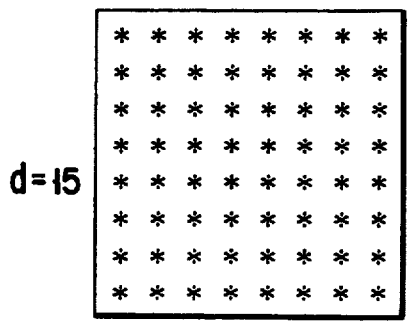
Figure 25F:
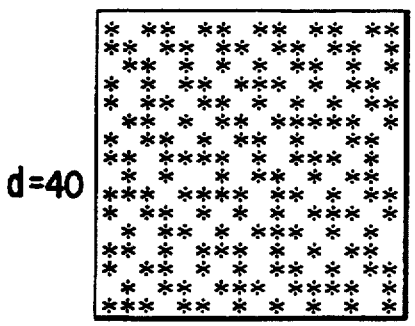
Figure 25C:
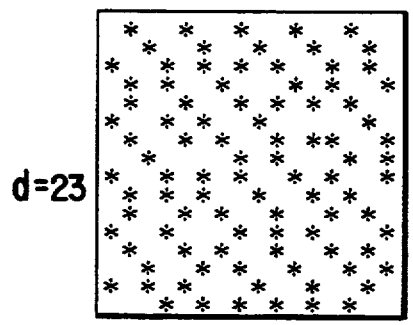
Figure 25G:
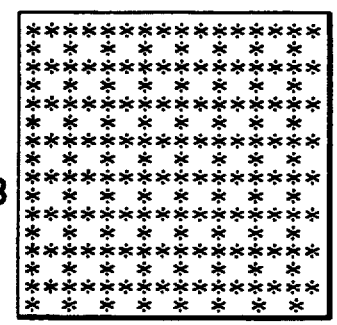
Figure 25D:
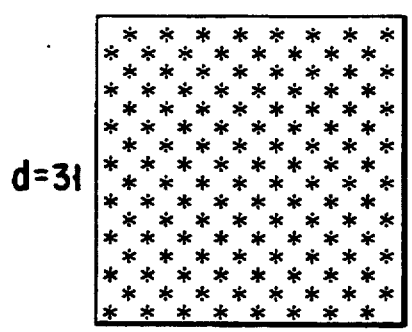
Figure 25H:
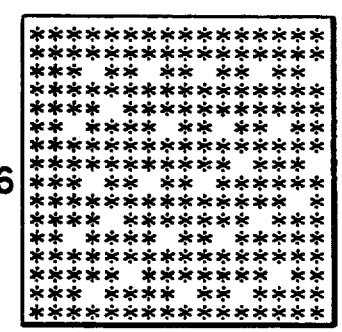

FIGS. 25A to 25H show various distribution patterns of black and white pixels in quasi-gray level images obtained by the error diffusion processing. These patterns are quasi-gray level expression results of original images having uniform gray level intensities by the error diffusion method. FIG. 25A shows a case of an intensity value=7; FIG. 25B, an intensity value=15; FIG. 25C, an intensity value=23; FIG. 25D, an intensity value=31; FIG. 25E, an intensity value=32; FIG. 25F, an intensity value=40; FIG. 25G, an intensity value=48; and FIG. 25H, an intensity value=56. In this case, the minimum value of an intensity is "0", and the maximum value is "64". In quasi-gray scale expression by the error diffusion method, black pixels are scattered as randomly as possible, and the distribution density of black pixels represents an intensity. However, since black pixels are scattered, images shown in FIGS. 25A to 25H have a low correlation among neighboring pixels.

Thus, FIGS. 26A to 26H show distribution patterns obtained upon execution of pixel replacement using the replacing functions F shown in FIGS. 24A and 24B. FIG. 26A shows a case of an intensity value=7; FIG. 26B, an intensity value=15; FIG. 26C, an intensity value=23; FIG. 26D, an intensity value=31; FIG. 26E, an intensity value=32; FIG. 26F, an intensity value=40; FIG. 26G, an intensity value=48; and FIG. 26H, an intensity value=56. As can be seen from FIGS. 26A to 26H, the correlation among neighboring pixels is increased.

Therefore, when the first pixel replacing unit 93 executes the above-mentioned pixel replacing processing, since the redundancy of data increases, compression efficiency upon coding can be improved.

In decoding, when inverse conversion to the replacing processing executed in the first pixel replacing unit 93 is performed using the second pixel replacing unit 104, original image data can be obtained.

Note that encoded data is added with m and n representing a subblock size and an inverse function $F^{-1}=F$ of the function F used in replacement executed for a corresponding image in the first pixel replacing unit 93 as management information. More specifically, in decoding, the function F in the added management information is set in the pixel replacing function F storage unit 131 of the second pixel replacing unit 104 by the CPU 10.

Next, variation of the resolution of display image data in the embodiment shown in FIG. 16 will be described below.

As described above, resolution variation of a quasi-gray level image is executed in the order of multi-value conversion→pixel density variation→re-binarizing.

In multi-value conversion in the resolution varying circuit 110, intensity estimation is performed not in units of subblocks but in units of pixels. More specifically, a method described in Jpn. Pat. Appln. KOKAI Publication No. 4-063809 (U.S. Pat. No. . . . ) can be incorporated as a reference. That is, the pixel density varying unit 114 calculates gray-scale varied pixels by linear interpolation on the basis of gray-scale pixel values output from the gray-scale unit 113. The re-binarizing unit 115 re-binarizes the gray-scale data obtained by the pixel density varying unit 114 by the quasi-gray scale processing units 117 and 118 of different methods, and outputs two different re-binarized data to the binarizing method selecting unit 116. Then, only the binarizing result by one method is selectively displayed on the CRT display 32 in accordance with a selection parameter set in the parameter register 119 of the binarizing method selecting unit 116.

On the other hand, a gray-level processing method (binarizing method) of an original quasi-gray scale image before gray-scale conversion is determined by the binarizing method determining unit 112. As a determination method, a method described in "Restoration of gray-scale image from binary image using area determination", Journal of Society of Image Electronics, Vol. 22, No. 2, or the method described in U.S. Pat. No. . . . can be incorporated as a reference. The determination result is supplied to the parameter register 119 in the binarizing method selecting unit 116 as a select signal. Since a parameter for selecting a re-binarizing method is set to be a value for selecting a method equivalent to a quasi-gray level processing method of an original image, the specific feature of the quasi-gray scale expression of an original image can be satisfactorily preserved even after resolution variation, and a reproduced output image which is faithful to an original image can be obtained.

Also, an arbitrary value can be set in the parameter register 119 by an I/O output of the CPU 10, and a re-binarizing method can be arbitrarily set irrespective of the binarizing method of an original image.

As described above, according to the second embodiment, since image data is coded after the correlation among neighboring pixels of a quasi-gray scale image is forcibly increased by pixel replacement, compression efficiency by high-efficiency coding can be improved. Furthermore, since the pixel replacing functions for increasing the correlation among neighboring pixels are adaptively and dynamically changed in accordance with the distribution tendency of black pixels based on a local intensity of an image, the improvement effect of the compression rate can be enhanced as compared to a case which adopts fixed replacement rules.

When a quasi-gray level image is reproduced and output after resolution variation and local enlargement/reduction, since re-binarizing is performed using the same method as that of quasi-gray scale processing of an input image, a high-quality output image which is faithful to an original image can be obtained.

As described above, according to the present invention, an image processing apparatus, which can improve compression efficiency of image data whose redundancy is lowered by quasi-gray scale processing, and can improve reproducibility upon outputting image data obtained by quasi-gray scale processing to a reproduction output device having a lower resolution, can be provided.

Also, an image processing apparatus, which can improve the compression rate of a quasi-gray scale image, can prevent deterioration of image quality caused by resolution variation upon reproduction and outputting of a quasi-gray scale image, and is suitable for processing of a quasi-gray scale image, can be provided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image processing apparatus comprising:
supply means for supplying first image data having a plurality of pixels;
first pixel replacing means for replacing positions of at least two pixels in the first image data supplied by said supply means to form second image data having a higher pixel redundancy than that of the first image data;
encoding means for encoding the second image data formed by said first pixel replacing means;
storage means for storing the second image data encoded by said encoding means;
decoding means for decoding the second image data stored in said storage means; and
second pixel replacing means for replacing positions of pixels in the second image data decoded by said decoding means to supply said first image data of which pixels are replaced by said first pixel replacing means.

2. An apparatus according to claim 1, further comprising:
third pixel replacing means for replacing positions of pixels in the first image data to form third image data;
pixel density varying means for varying a pixel density of the third image data supplied from said third pixel replacing means; and
display means for displaying the third image data whose pixel density is varied by said pixel density varying means.

3. An apparatus according to claim 2, wherein each of said first, second, and third pixel replacing means comprises:
pixel replacement logic means for replacing pixels in each rectangular block of image data, said image data being divided into blocks of m×n pixels; and
programming means for setting a pixel replacement sequence in said pixel replacement logic means.

4. An apparatus according to claim 3, wherein said programming means comprises:
- a memory for storing replacement rule information representing the pixel replacement sequence; and
- means for reading out predetermined replacement rule information from said memory.

5. An apparatus according to claim 4, wherein said pixel replacement logic means comprises:
- means for temporarily storing all pixels included in the rectangular block;
- means for sequentially outputting the temporarily stored pixels in accordance with the predetermined replacement rule information read by said reading means; and
- means for re-arranging the pixels output by said outputting means at predetermined positions in the rectangular block in a predetermined order.

6. An apparatus according to claim 1, wherein said first pixel replacing means includes means for replacing at least two pixels of said first image data without changing total numbers of pixels of said first image data, so as to increase correlation of adjacent pixels of said first image data.

7. An image processing apparatus comprising:
- supply means for supplying first image data having a plurality of pixels;
- estimating means for estimating an intensity value of the first image data supplied by said supply means;
- first storage means for storing a plurality of parameters to set a plurality of pixel replacement functions corresponding to an intensity of image data, said pixel replacement function defining a pixel replacing rule to replace pixels so as to increase redundancy of the first image data;
- means for setting a pixel replacing function based on the intensity estimated by said estimating means and the plurality of parameters stored in said first storage means;
- first pixel replacing means for replacing positions of pixels in the first image data in accordance with the pixel replacing function set by said setting means so as to supply second image data;
- encoding means for encoding the second image data supplied from said first pixel replacing means;
- second storage means for storing the second image data encoded by said encoding means and the pixel replacing function set by said setting means;
- decoding means for decoding the second image data stored in said second storage means; and
- second pixel replacing means for replacing positions of pixels in the second image data decoded by said decoding means in accordance with the pixel replacing function stored in said second storage means so as to supply the first image data of which pixels are replaced by said first pixel replacing means.

8. An apparatus according to claim 7, wherein said setting means comprises:
- third storage means for storing a plurality of pixel replacing functions; and
- selecting means for selecting one of the pixel replacing functions stored in said third storage means on the basis of the intensity value estimated by said estimating means.

9. An apparatus according to claim 8, wherein said intensity estimating means comprises a counter for counting the number of black pixels included in a pixel block having a predetermined number of pixels.

10. An apparatus according to claim 7, further comprising:
- means for determining a binarizing method of the first image data;
- means for converting the first image data into gray-scale image data;
- means for varying a pixel density of the gray-scale image data converted by said converting means;
- re-binarizing means for re-binarizing the gray-scale image data, whose pixel density is varied by said pixel density varying means, by a plurality of re-binarizing methods;
- selecting means for selecting one of the plurality of image data re-binarized by the plurality of re-binarizing methods by said re-binarizing means based on the binarizing method determined by said determining means; and
- display means for displaying the re-binarized image data selected by said selecting means.

11. An apparatus according to claim 7, further comprising:
- means for instructing a binarizing method of the first image data;
- means for converting the image data into gray-scale image data;
- means for varying a pixel density of the gray-scale image data converted by said converting means;
- re-binarizing means for re-binarizing the gray-scale image data, whose pixel density is varied by said pixel density varying means, by a plurality of binarizing methods;
- selecting means for selecting one of the plurality of image data binarized by the plurality of re-binarizing methods by said re-binarizing means based on the binarizing method instructed by said instruction means; and
- display means for displaying the re-binarized image data selected by said selecting means.

* * * * *